J. H. MORRELL.

WATER TRAP SUPPLIES AND CONNECTIONS.

No. 6,775.

Reissued Nov. 30, 1875.

WITNESSES:

Francis M. Ridley,

Alex F. Roberts

INVENTOR:

BY J. H. Morrell

Munn & Co.

ATTORNEYS.

N. PETERS, PHOTO-LITHOGRAPHER, WASHINGTON, D. C.

UNITED STATES PATENT OFFICE.

JOHN H. MORRELL, OF NEW YORK, N. Y.

IMPROVEMENT IN WATER-TRAP SUPPLIES AND CONNECTIONS.

Specification forming part of Letters Patent No. 168,405, dated October 5, 1875; reissue No. 6,775, dated November 30, 1875; application filed November 6, 1875.

*To all whom it may concern:*

Be it known that I, JOHN H. MORRELL, of the city, county, and State of New York, have invented new and useful Improvements in Water-Trap Supply and Ventilation, of which the following is a specification:

The invention relates to new forms of water-receptacles, and new arrangement of ventilating-pipes, which are also to be used as water-supply pipes for the traps of buildings and apartments.

The invention consists, first, in the employment of a water-reservoir of peculiar construction, placed in any suitable position, and furnished with distributing-pipes, by which the water is conducted from the said reservoir to any portion of the building, or to any apartment where it is needed, and to the traps of the water-closets and sewer-pipes pertaining to the building or apartments thereof, whereby the water will be caused to supply the said traps, and also, by its downflow, to cleanse and purify the sewer-pipes.

The invention consists, secondly, in the ventilation of the water-traps and sewers pertaining thereto through the aforesaid conducting-pipes and reservoir, the arrangement thereof being such that when there is no downflow of water all foul gases or bad air arising from said sewers and water-traps will have free vent and escape through said conducting-pipes and reservoir to the atmosphere above the roof of the building.

The invention consists, thirdly, in the employment of one or more divided or partitioned water-chambers, placed on or near the traps of the water-closets or sewer-traps, said chambers being so formed that a portion of the water which enters the same will pass by a suitable pipe from said chamber into the trap, while another portion of the water will, by means of another pipe from said chamber, be conducted to another trap in some other portion of the building or apartment.

The invention consists, fourthly, in the general arrangement of the water-reservoir, conducting-pipes, and divided or partitioned water-chambers and their pipes, in such a manner that the overflow of water from the said reservoir will be caused to flow through, supply, cleanse, and purify the water-closet traps and sewer-pipes, while at all times, when there is no downflow of water, the aforesaid devices will serve as open escapes and ventilators for all bad air or gases arising in said traps and sewer-pipes.

Figure 1:
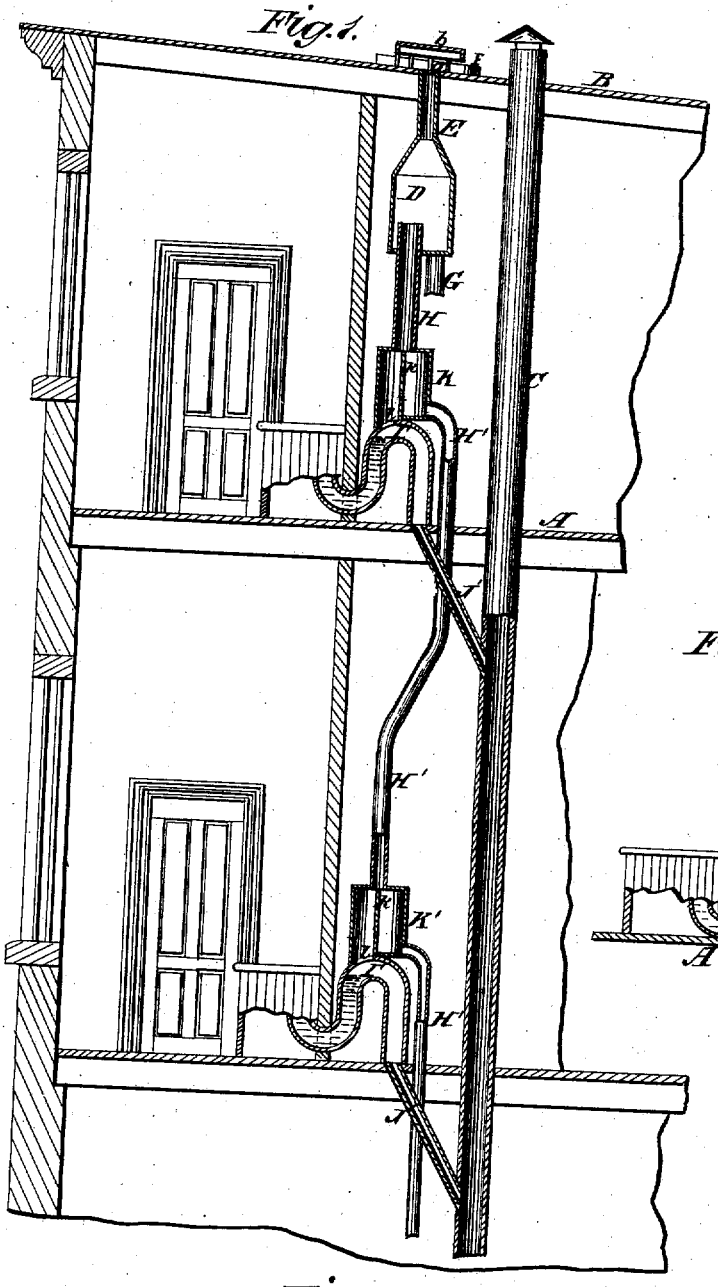
Figure 3:
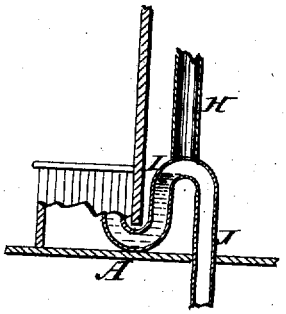
Figure 2:
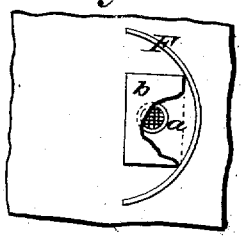

Referring to the drawings, Figure 1 is a side sectional elevation of a building provided with my improvements. Fig. 2 is a partial plan view of the roof of a building, showing a method of water-collection. Fig. 3 is an elevation, showing a modification of one of my improvements.

Similar letters of reference indicate corresponding parts in all the figures.

A A are floors of the building; B, the roof thereof; C, a sewer-pipe, which may rise from the sewer-pipe in the ground directly through the building, terminating above the roof with a ventilating-cap, as shown. In any suitable position I place a distributing water receiver or reservoir, D, having a suitable supply-pipe, E, which may be carried to any suitable place on and through the roof B, where the mouth of the pipe may be covered by a grating, *a*, and cap *b*. A vertical dam, F, (see Figs. 1 and 2,) attached to the roof, will collect the rain-water, which will flow down into the reservoir D, which is provided with suitable distributing-pipes G, for conducting the water to such parts of the building as may be needed. One or more pipes, H, may be arranged as overflow-pipes, and will conduct off all water that rises above their orifices in the reservoir D. Water collected in the reservoir below the orifice of H is conducted by the other pipes G, as stated. The overflow-water carried by pipes H is intended to fill one or more of the water-closet traps of the building, for which purpose the said pipe may communicate directly with the top of the trap I, as in Fig. 3, in which case the water fills the trap, and then flows down through the discharge-pipe J to the sewer or other place of discharge.

Instead of connecting the pipe H directly with the trap, it may, as in Fig. 1, connect with a suitably-located receiver, K, which contains a partition, *k*, so arranged that water entering from H will be divided, one portion of the water being directed by a suitable orifice or pipe, *l*, into the water-closet trap I′, and thence by pipes J′ to the sewer-pipe C, while the other portion of the water will be conducted by a pipe, H′, to another receiver, K′, to be thence divided and conducted to other traps or other partitioned receivers, as may be required, in the manner substantially as above described.

The foregoing arrangement of the reservoir D, conducting-pipes H H′, chambers K K′, traps, and their discharge-pipes J J′ is such that, in addition to the storage of water in the reservoir D, the traps or adjuncts of water-closets are cleansed by every downflow of water, while at other times there is a clear upward exit and escape through the said pipes, chambers, traps, and reservoir for bad gases that may rise from or within said pipes, water-closet traps, or sewer-pipes.

My improvements, therefore, embody the fourfold advantage of a storage-reservoir, a distributing-reservoir for water, of a water-closet trap-supply and pipe-cleaner, and of a ventilating apparatus. The supply, cleansing, and ventilation of the traps and pipes is automatic, being done whenever there is an overflow from reservoir D. This is of advantage, especially when the building is unoccupied, as the traps will be recharged automatically, and thereby save the expense of employing a person to enter the building periodically for such purpose, and who, through carelessness or oversight, might omit one or more traps, or possibly leave the house unlocked.

In the drawing I have shown the main pipe C from the sewer or drain running up through the roof of the building; but in most cases the said pipe need not extend above the line of the trap on the upper story of the building, as the ventilation may be completed through the upper trap and pipe leading to the roof therefrom, and thereby save the expense of the length of main pipe through the upper story.

In some cases, when the pipes would be subject to extreme heat or cold, I propose to cover the same with a second pipe or sheathing.

I do not limit or confine myself to the exact form or position of any of the parts here shown, as they may be varied without departing from my invention.

Having thus described my invention, what I claim as new, and desire to secure by Letters Patent, is—

1. The water-reservoir D, constructed substantially as herein described, so as to serve as a storage-reservoir as well as a distributing-reservoir, permitting also of ventilation, in combination with a pipe leading to and opening through the roof, and another leading to and communicating with one or more traps below, substantially as specified.

2. The combination of said reservoir D with one or more traps, substantially as described, so that said traps will be both supplied and ventilated, as set forth.

3. The partitioned chambers K K′, constructed and operating substantially as described.

4. In a water-supply, the combination of the water-supply pipe with the trap, so arranged that the former subserves the double purpose of a supply-pipe and ventilator, substantially as specified.

JNO. H. MORRELL.

Witnesses:
T. B. MOSHER,
ALEX. F. ROBERTS.